Oct. 25, 1932.   J. M. HOTHERSALL   1,884,699
METHOD OF MAKING FRICTION CLOSURES
Filed March 2, 1929
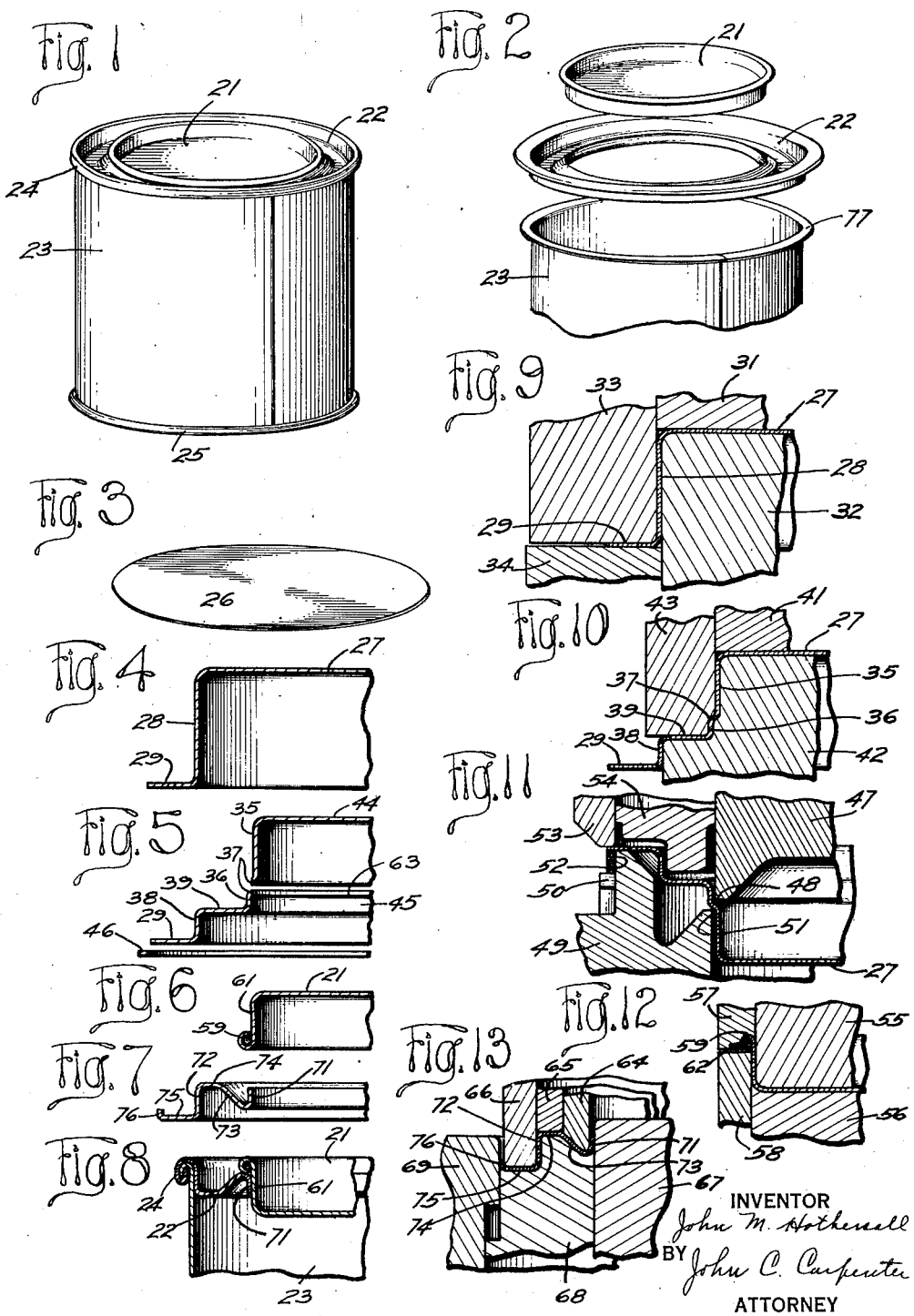
INVENTOR
John M. Hothersall
BY John C. Carpenter
ATTORNEY Patented Oct. 25, 1932

1,884,699

UNITED STATES PATENT OFFICE

JOHN M. HOTHERSALL, OF BROOKLYN, NEW YORK, ASSIGNOR TO AMERICAN CAN COMPANY, OF NEW YORK, N. Y., A CORPORATION OF NEW JERSEY

METHOD OF MAKING FRICTION CLOSURES

Application filed March 2, 1929. Serial No. 343,992.

The present invention relates to a method of producing container closures and is particularly directed to producing a two part friction closure.

The principal object of the present invention is the provision of a method for forming a friction ring and a friction plug from a sheet of material, the friction plug being removed from the central or inner part of the friction ring, both parts being thus produced from a blank no larger than that required for the friction ring alone.

Another important object of the invention is the provision of a method of producing inner and outer parts of friction closures wherein the removing of the inner part from the outer part produces the required opening in the latter.

A further important object of the invention is the provision of a method for producing two part friction closures, wherein one part is cut from within the other part one or both parts being subsequently altered to provide frictional engagement between the parts.

Numerous other objects and advantages of the invention will be apparent as it is better understood from the following description, which, taken in connection with the accompanying drawing discloses a preferred embodiment thereof.

Referring to the drawing:

Figure 1 is a perspective view of a container provided with a friction closure made in accordance with the present invention;

Fig. 2 is a perspective view of the upper part of a container and of a separated friction ring and plug made in accordance with the present invention;

Fig. 3 is a perspective view of a blank from which the closure parts are formed;

Fig. 4 is a fragmentary section of the blank after undergoing a first formative operation;

Fig. 5 is a view similar to Fig. 4 illustrating the results of a subsequent operation;

Fig. 6 is a fragmentary section of a completely form friction plug;

Fig. 7 is a fragmentary section of a formed friction ring;

Fig. 8 is a broken sectional view of an assembled friction ring and plug secured to a container;

Fig. 9 is a fragmentary section showing parts of a die mechanism in position for producing a first operation on the closure blank;

Fig. 10 is a view similar to Fig. 9 illustrating a second operation;

Fig. 11 is a fragmentary section of a die mechanism for trimming and dividing friction closure parts;

Fig. 12 is a broken sectional view of die parts used in finally forming a friction plug, and Fig. 13 is a similar view illustrating the final forming operation on a friction ring.

A two part friction closure formed according to the present invention consists of a friction plug 21 and a friction ring 22, the latter being secured to a container or can 23 in a suitable manner as for example by means of a double seam 24. Container 23 may be provided with a bottom 25.

According to the present invention plug 21 and ring 22 are formed from a blank 26 (Fig. 3) of suitable sheet material, preferably sheet metal, which is subjected to die mechanism in a series of operations. The first operation upon blank 26 produces a cup shaped member 27 (Fig. 4) having an annular side wall 28 and an extended annular flange 29.

Cup member 27 may be produced from the blank 26 by a die mechanism, the principal parts of which are disclosed in Fig. 9. This mechanism comprises an upper die member 31 a lower die member 32 and cooperating upper and lower die rings 33 and 34.

The shape of member 27, as here disclosed is particularly suited for manufacture of a particular type of friction closure but this form of member 27 will vary where other types of closures are manufactured. For example a shape somewhat resembling the present cup member 27 is disclosed in my pending application, Serial Number 287,862 filed June 23, 1928, wherein an entirely different form of closure is contemplated.

Cup member 27, for certain types of friction closures, may be further reshaped by a die mechanism the principal parts of which are shown in Fig. 10. Such a mechanism produces a cup member 27 having a plurality of concentric walls, these being an inner wall 35, an intermediate wall 36 (joined therewith by an annular inwardly and outwardly extending surface or offset portion 37) and an outer wall 38, this latter being a part of former wall 28. Wall 38 is thus adjacent flange 29 and is connected to wall 36 by a web 39.

The mechanism for producing this reshaped cup member 27 comprises an upper die member 41 (Fig. 10) a lower die member 42 and an upper die ring 43 cooperating in this operation with a shoulder formed on the lower die member 42.

Cup member 27 at this point of operation contains the potential friction plug and ring and it may contain nothing else. However where the final friction closure is to be used in a can of the sanitary type it is desirable to trim the outer edge of flange 29. In the next operation the cup member is divided into an inner part 44 (Fig. 5) an outer part 45 and if a sanitary can is to be manufactured a trim 46, the latter being thrown away as it is of no further use.

The mechanism for this dividing and trimming operation is illustrated in Fig. 11, and comprises an upper die member 47 having a cutting edge 48, and a lower die member 49 having a cutting edge 51. The cutting edges 48 and 51 cooperate to sever the parts 44 and 45 from cup member 27 by a shearing action, the line of severance being along inclined surface 37.

Member 49 also carries a lower trimming edge 52 cooperating with an upper trimming member 53 these members separating the trim 46 from the part 45. An annular knockout ring 54 is also provided between members 47 and 53 and operates after the cutting action to strip part 45 from die member 47. Successive trims 46 accumulating on trimming member 52 will be eventually forced against one or more cut edges 50 (arranged around the edge of member 49) and will be separated into scrap pieces which will fall away from the die mechanism.

Following the severing operation both of the parts 44 and 45 are subjected to further forming operation to produce the finished friction plug and ring. However one of the parts may be made into such size and shape by the forming mechanism just described as to require no further change of form.

As illustrated in Fig. 12 a die mechanism comprising upper and lower die members 55 and 56 and cooperating die rings 57 and 58 may be used to bend the edge of part 44 and to provide the finished plug 21 with an outer curled edge 59. Said plug also has a friction wall 61 (Fig. 6) which may or may not be altered in diameter from the wall 35. To produce the curled edge 59 die ring 57 is formed with a properly shaped annular groove 62 in which the edge is formed.

By removal of the inner part 44 from the cup member 27 in the preceding operation an opening 63 is formed in part 45 and the edge about this opening must be shaped to provide a friction wall and the parts 29, 36, 38 and 39 must be formed to provide the complete friction ring 22. For this purpose part 45 is next subjected to a die mechanism illustrated in Fig. 13.

The principal parts of this mechanism comprise upper die members 64, 65 and 66 which cooperate in a usual manner with lower die members 67, 68 and 69 to produce a properly sized friction wall 71, a wall 72 concentric therewith, said walls being joined by an inclined web 73 and a straight web 74. A flange 75 is also provided beyond the wall 72 and a slight curl 76 is or may be also formed on the edge of flange 75.

The resulting friction ring 22 thus formed constitutes a preferred form of friction ring adapted to be united to a usual form of can body flange 77 (Fig. 2) to provide the double seam 24 of a sanitary can.

Friction ring 22 (Fig. 8) is then united to a can 23 and the complete friction closure is effected by inserting friction plug 21 within friction ring 22, its friction wall 61 engaging friction wall 71 of the ring. In commercial practice is has been found that a satisfactory friction seal is produced between friction walls 61 and 71 when said walls are of substantially the same diameter.

It is thought that the invention and many of its attendant advantages will be understood from the foregoing description and it will be apparent that various changes may be made in the form, construction and arrangement of the parts, without departing from the spirit and scope of the invention, or sacrificing all of its material advantages, the form hereinbefore described being merely a preferred embodiment thereof.

I claim:

1. The method of producing a friction closure for a container, which comprises shaping a blank of sheet material into a cup member having two adjacent concentric walls of said cup of different diameters connected by an offset 37 in the side of the cup member which off-sets said concentric walls out of line with each other, dividing said member into an inner and an outer part by severing said offset by a cutting action in a direction parallel with said walls, forming said inner part into a friction plug having an exterior friction wall of given dimension, and forming said outer part into a friction ring having an interior friction wall of dimension adapting it to engage the friction wall of said friction plug.

2. The method of producing a friction closure for a container, which comprises shaping a blank of sheet metal into a cup member having in its side wall an inwardly and outwardly extending offset 37, dividing said member into an inner part and an outer annular part by severing said offset in a direction parallel with the axis of the cup member, and then flanging said annular part and adapting it for attachment to a can body, and forming said inner part to fit within said annular part as a friction plug.

3. The method of producing a friction closure for a container, which comprises shaping a blank of sheet metal into a cup member having in its side wall an inwardly and outwardly extending offset 37, dividing said member into an inner part and an outer annular part by severing said offset in a direction parallel with the axis of the cup member and in line with the inner surface of the cup member leaving said offset extending outward from the top of the inner part, and then forming said annular part for attachment to a can body, and forming said inner part to fit within said annular part as a friction plug and forming said offset into an outward curl of the edge of said inner part.

4. The method of producing a friction closure for a container, which comprises shaping a blank of sheet metal into a cup member having in its side wall an inwardly and outwardly extending offset 37, dividing said member into an inner part and an outer annular part by severing said offset in a direction parallel with the axis of the cup member, and then trimming and flanging said annular part and adapting it for seaming to a can body, and forming said inner part to fit within said annular part as a friction plug.

5. The method of producing a friction closure for a container, which comprises shaping a blank of sheet material into a cup member, having a plurality of concentric walls of different diameters connected by an offset 37, dividing said member into an inner and an outer part by severing the said offset in a direction parallel with said walls, forming said inner part into a friction plug having an exterior friction wall of given dimension, and forming said outer part into a friction ring having an interior friction wall of dimension adapting it to engage the friction wall of said friction plug.

6. The method of producing a friction closure for a container, which comprises shaping a blank of sheet material into a cup member, removing the central portion from said member by cutting its side wall at a line intermediate the top and bottom of said member and in a direction parallel with the cylindrical wall of the cup member, thereby providing an inner part and an annular outer part having an opening, and contracting the edge of the opening of said outer part and forming said edge into a friction seat for frictional engagement with said inner part.

7. The method of producing a friction closure for a container, which comprises drawing a blank of sheet material into a cup member, shaping said member by providing a plurality of concentric walls of different diameters, trimming the edge thereof, dividing said member into an inner and an outer part by severing the side wall of the cup member in a direction parallel with said walls, forming said inner part into a friction plug having an exterior friction wall and a rounded edge, and forming said outer part into a friction ring having concentric outer and inner walls, the latter constituting a friction wall of substantially the same dimension as the friction wall of said friction plug.

JOHN M. HOTHERSALL.